3,440,100
STORAGE BATTERY
Ricardo Salcedo Gumucio and Angel Pascual Ardanuy, Madrid, Spain, assignors to Instituto Nacional De Industria, Madrid, Spain
Filed Dec. 13, 1965, Ser. No. 513,200
Claims priority, application Spain, June 2, 1965, 313,675
Int. Cl. H01m 39/00, 41/00
U.S. Cl. 136—26                           12 Claims

ABSTRACT OF THE DISCLOSURE

A storage battery which comprises a housing, at least one positive electrode including lead dioxide as active mass, located in the housing, at least one negative electrode including as negative active mass a composite amalgam of silver and of at least one metal selected from the group consisting of zinc, cadmium and copper, located in the housing spaced from the positive electrode, and an acidic electrolyte consisting essentially of sulfuric acid of effective concentration located in the housing and contacting the positive and negative electrodes.

---

The present invention relates to a storage battery and, more particularly, to an acidic storage battery of the type utilizing lead dioxide as the active mass of the positive electrode.

It has been attempted to form acidic storage batteries with a zinc-sulfuric acid-lead dioxide galvanic system or a cadmium-sulfuric acid-lead dioxide galvanic system.

However, these systems did not meet with technical success, particularly due to self discharge of the negative electrode and difficulties connected with recharging such batteries.

The earliest attempts to provide such batteries appear to have been carried out towards the end of the last century and at the beginning of the present century by Regnier. Consequently, zinc-sulfuric acid-lead dioxide storage batteries or cells are known as the "Regnier cell." The interest in such systems for storage batteries continues due to the limitations of the conventional lead acid battery. It is well known that these limitations of the lead acid battery include a disadvantageous relationship between the weight of such battery and the amount of energy that can be stored therein, and also the spontaneous sulfating of the negative plate which occurs in batteries of this type if they are not properly operated. In view of these disadvantages of the lead acid battery, it would be desirable to use and electrode which is non-sulfatable by chemical attack and, if possible, including, or composed of, an element whose electrochemical equivalent would be more favorable than that of lead. For reasons of this kind, alkaline storage batteries, such as nickel-iron, nickel-cadmium, silver-cadmium and silver-zinc batteries were developed.

However, the old acidic systems of storage batteries are potentially cheaper and capable of delivering more electricity than alkaline systems. There are only a few electrochemical systems capable of accumulating energy. On the other hand, replacement of the negative electrode of the lead battery with a soluble sulfate electrode is of practical interest for two reasons, namely, the elimination of chemical sulfating, and the ability to discharge large quantities of electric energy from a battery of relatively small weight. Zinc was primarily investigated, although, in addition, cadmium and copper were studied. These three elements form sulfates which are soluble in the acid electrolyte, i.e., in aqueous sulfuric acid, and by combining these metals in the negative electrode with the very reactive lead dioxide positive electrode, it will be possible to arrive at several embodiments of potentially reversible, i.e., chargeable and dischargeable, storage batteries. Zinc is preferred for this purpose, primarily due to the fact that the free energy from the reduction of lead dioxide by zinc in an acid medium equals about 108.56 Kcal., corresponding to an electromotive force of about 2.35 volts determined from thermal data, or 2.448 volts if the lead dioxide-zinc semi-elements which are shown in the electrochemical couple oxidation-reduction tables are combined, for instance in accordance with the disclosure in "Oxidation Potentials" by Latimer, second edition, pp. 340 and 345. Furthermore, a zinc-lead battery will be of considerably lesser weight than a lead battery, since the ratio of electrochemical equivalence between zinc and lead is 1:3.17.

However, these advantages of the last described electrochemical system, which represents a galvanic couple capable of supplying an electromotive force of about 2.5 volts, could not be utilized successfully in view of the apparently unsurmountable difficulties involved in obtaining complete reversibility of the system, elimination of the self discharge of the negative plate, and maintenance of the charge of the charged battery.

These difficulties may be subdivided into different groups, namely inherent difficulties with respect to the permanence of the active matter of the negative electrode; difficulties concerning the nature and material of the support portion of the electrode such as a wire mesh, grid or plate to which the negative active mass adheres; difficulties connected with the regeneration of the negative active mass in a compound and firm form during the charging process; and, furthermore, difficulties with respect to the corrosion resistance of the supporting portion of the negative electrode, especially at the terminal zones thereof which are exposed to moisture, acid and air. It has been proposed to maintain zinc, cadmium or, more generally, any other metal which can be attacked by sulfuric acid under formation of a sulfate which is soluble in the sulfuric acid, in amalgamated state, because the presence of mercury will considerably increase the over-tension of hydrogen on these elements. It was believed that an appropriate increase in the degree of amalgamation of the negative active mass would be sufficient to prevent spontaneous chemical dissolution of the negative active mass and, consequently, to maintain the charge in the storage battery. Although the presence of mercury is required for this purpose, it must be taken into consideration that the necessarily high degree of amalgamation will give to the amalgamated negative active mass a certain degree of flowability or fluidity. This fluidity increases with an increase in the proportion of mercury in the amalgam and thus with the advance of the discharge of the battery. Thereby, the mechanical structural conditions of the electrode are impaired. Normally, the electrode is placed in a vertical position, and in this position, liquid amalgam may flow off the negative electrode and fall onto the bottom of the battery housing.

Furthermore, the electrochemical conditions in the battery are modified during charging since there is an uneven distribution of mercury and therefore of active amalgam at the electrode surface, with a higher concentration of mercury at the lower portion of the electrode and a lesser concentration of mercury at the upper portion thereof. Thus, non-homogeneous amalgams are formed on the electrode which will produce local reactions and self-discharge. For these reasons, it has been proposed to arrange negative electrodes so as to extend horizontally within the battery housing, thereby causing the quite obvious mechanical and electrical difficulties connected with such positioning of the negative electrode. Furthermore, due to the reactivity between zinc and cadmium on the one hand and sulfuric acid on the other hand, even with a horizontally extending negative electrode of this type, it is not possible to prevent or adequately reduce the speed of the solution of the elements, i.e., zinc or cadmium in the acid, and, consequently, self discharge phenomena where only partially prevented. From a practical point of view, replacing zinc by cadmium or copper did not give decisive advantages. The use of cadmium, for instance, reduces the electromotive force down to 2.088 volts with practically the same disadvantages as zinc and higher costs and weight per cell. This more than outweighs the lesser degree of the self-discharge phenomena which were observed when using cadmium amalgam instead of zinc amalgam. The use of copper amalgam has further disadvantages, particularly because of the low electromotive force of only 1.348 volts in the case of copper.

Self-discharge phenomena may also be reduced by using an acid solution of the sulfate corresponding to the metal which is dissolved, i.e., by increasing the osmotic pressure of ions being emitted from the negative electrode, as already shown by Regnier, however, under these circumstances, the free acid necessarily must be weak, i.e., highly diluted, which will impair the performance of the lead dioxide plate and increase the electrical resistance of the electrolyte. Thus, in summary, the prior art suggestions have tended to propose strong acid in connection with a high degree of amalgamation, or a weak acid and zinc or cadmium amalgam, or zinc or cadmium acid sulfate and an amalgam of these metals.

With respect to the supporting structure of the electrode, be it a grid or wire mesh or any other conventional supporting structure known to those skilled in the art, which will serve to support the active mass, i.e., in the presently discussed case the active amalgam, a free acid-resistant metal or alloy appears to have been used in all cases. Generally, a thin plate of lead was used as a support and the negative active mass, i.e., the amalgam, was adhered thereto by mechanical pressure or by electrolytic precipitation of active metal together with mercury. However, the use of lead as the supporting portion of the negative electrode has not been successful with respect to the conductivity of the electrode. A trend towards passivation was observed, probably due to the formation of a lead sulfate film.

It has also been proposed to combine amalgamated copper with a quantity of mercury sufficient to also amalgamate zinc or cadmium made available by precipitation from an electrolyte including the respective sulfates of the two last mentioned metals. However, since copper is an easily amalgamable metal, slowly and over long periods of time, diffusion of copper into the active amalgam took place. Eventually, the copper would pass into the electrolyte and cause therein the formation of cupric ions which then were precipitated together with zinc or cadmium at the negative electrode during charging of the battery and produced local reactions and corrosion at the terminals, which is a common effect of copper and copper alloys.

Thus, to applicants' knowledge, all prior art suggestions on the basis of composite electrolytes in a weak acid medium have failed, as well as those utilizing amalgam electrodes of a high degree of amalgamation and a relatively weak acid as compared with the acid used in lead storage batteries, i.e., as compared with 25–36% aqueous sulfuric acid.

Apart from the technical difficulties described to some extent hereinabove, the failure of these prior attempts was also due to the absence of a complete reversibility of these systems.

It is therefore an object of the present invention to provide an acidic storage battery which overcomes the above discussed difficulties and disadvantages.

It is another object of the present invention to provide an acidic storage battery with a favorable ratio between the weight of the battery and the capacity for storing electric energy in the same.

It is yet another object of the present invention to provide an acidic storage battery with substantially complete reversibility of charge and discharge conditions.

It is also contemplated according to the present invention to utilize electrodes which are capable of performing at the acidity level of conventional lead batteries, i.e., with aqueous sulfuric acid of between about 25 and 36% concentration as the electrolyte, in order to assure optimum performance of the positive lead dioxide electrodes and double sulfation of positive and negative plates. However, unlike the negative plate of a lead battery, the sulfate of the negative plate of the battery of the present invention will be soluble.

If a weak acid is used with the electrolyte, in order to prevent the solution of zinc or cadmium, which weak acid is not capable to convert faradically or totally the equivalent quantity of lead dioxide into sulfate, the discharge characteristics of such storge battery at a constant rate of current withdrawal will show with zinc as the active mass of the negative electrode a double "plateau," namely one at 2.3 volts at average current discharge, which correspponds to the reaction in which the double sulfation of the electrodes and a slow voltage drop occurs, thereafter, the voltage will drop further, the steepness of the slope depending upon the degree of acidity of the electrolyte, until a final "plateau" of between about 0.4 and 0.6 volt is reached. This final plateau corresponds to the total reduction of the positive plate into spongy lead. Only the first plateau, i.e., discharge at about 2.3 volts is technically useful. It starts, for all practical purposes, at about 2.5 volts and slowly goes down to about 2 volts, followed by the much faster voltage drop to the lower plateau. To retain a voltage of about 2 volts until the practical end of the discharge is only possible by using negative electrodes capable of remaining, without self-discharge, at the acidity level of the conventional lead storage battery. If this is not the case then the battery would not work properly even if very large quantities of weak electrolyte were used, which large quantities are inconvenient from a technical or practical point of view and have a reaction kinetic at the positive plates which is very slow.

It is thus a further important object of the present invention to provide an acidic storage battery, the positive electrode of which contains lead dioxide as active mass, which battery is operated with sulfuric acid of the concentration conventionally utilized in lead acid batteries as electrolyte and which battery overcomes the above discussed difficulties of prior art batteries other than lead acid batteries, and which also constitutes a significant improvement over the conventional lead acid battery.

Other objects and advantages of the present invention will become apparent from a further reading of the description and of the appended claims.

With the above and other objects in view, the present invention contemplates a storage battery, comprising, in combination, a housing, at least one positive electrode including lead dioxide as active mass, located in the housing, at least one negative electrode including as negative active mass a composite amalgam of silver and of at least one metal selected from the group consisting of zinc, cadmium and copper, located in the housing spaced from the positive electrode; and an acidic electrolyte located in the housing and contacting the positive and negative electrodes.

Thus, according to the present invention, silver is used as an essential constituent of the active mass of the negative electrode, in addition to the active metals such as zinc, cadmium, copper or the like.

Silver and zinc, for instance, may form alloys of definite chemical composition. Thus, these metals have a certain degree of affinity towards each other, and although generally the amount of silver in the negative active mass will be less than the amount required to form such defined alloy of zinc and silver wherein these two metals are stoichiometrically combined, the mixture of zinc and silver when suitably amalgmated will have a greater resistance against chemical attack by the free acid of the electrolyte than would the conventional zinc amalgam.

Without attempting to limit the present invention to any specific theoretical explanation, it would seem that the part played by the silver in the porous composite amalgam which forms the active mass of the negative electrode could be explained as follows:

During discharge of the battery, while the soluble element such as zinc, cadmium or the like is dissolved, silver amalgam will adhere to the negative electrode frame or supporting portion. This silver amalgam contains only a very small proportion of the soluble metal and it will be highly porous so that its surface is much larger than the geometrical surface of the negative electrode. During charging of the battery, the above described porous silver amalgam will receive the soluble metal which was dissolved in the electrolyte during discharge of the battery. Under these conditions, the soluble metal during its electrochemical reduction will be homogeneously distributed over the entire highly porous silver amalgam surface, probably under formation of alloys beween such metal and silver. The silver amalgam will give up mercury to the thus precipitated metal, either almost simultaneously with precipitation of the previously dissolved metal, or at least in a manner satisfactory with respect to the amalgamation kinetics. Therefore, the amalgamated, porous silver represents an ideal captor which distributes mercury under uniform conditions at any portion of the electrode and thus prevents the formation of non-homogenous and fluid or flowable amalgams such as were produced according to the above described prior art methods which did not incorporate silver in the active mass amalgam of the negative electrode.

Thus, the use of silver in the amalgam forming the active mass of the negative electrode appears to represent a basic improvement under the specified conditions, i.e., in an acidic storage battery, particularly with a lead dioxide positive electrode, which will permit obtaining of electrochemical reversibility of the battery.

It is also possible to form the amalgam of an alloy of silver and the soluble element such as zinc or cadmium, which alloy is then amalgamated, rather than separately amalgamating silver and the soluble metal such as zinc or cadmium. Although many characteristics of these wto different types of amalgams, namely those formed of the individual metals and those formed of an alloy of these metals, will be similar, it seems to be indicated that the amalgam of high silver and mercury content and low content of the soluble metal which remains after the soluble metal has been dissolved during discharge of the battery will be of a more porous nature if initially an alloy had been amalgamated and thus an even more improved electrochemical reversiability of the cell or storage battery will be obtained.

Again without attempting any theoretical explanation, it would seem that amalgams of uniform quantitative composition which, however, were formed by amalgamating a silver-zinc or silver-cadmium alloy give results which are even better than those obtained with amalgams formed by the amalgamation of silver and cadmium or zine without prior alloying of the silver with the soluble metal.

It has been found, according to the present invention, that as amalgam consisting, for instance, of zinc, silver and mercury, when spread on a silver sheet or grid or on a previously silver-plated iron sheet or the like, or on a silver-plated lead or silver-plated titanium sheet as the supporting portion of the negative electrode, will form a zinc electrode with highly advantageous electrochemical and mechanical properties, capable of resisting very high degrees of acidity, depending on the proportion of the metal in the amalgam. Furthermore, during discharge, the dissolution of zinc will not cause weakening or flowing of the residual active mass-forming amalgam, the electrode will remain highly porous due to the compactness of the lean zinc-silver amalgam which at the end of the discharge will be of a composition approaching the stoichiometric combination $Zn_5Ag_2(Hg)$. This combination, for all practical purposes is no more attacked, in open circuit, than a zinc electrode, even in 36% sulfuric acid as electrolyte.

Zinc constitutes the preferred soluble metal according to the present invention, although, as pointed out above, cadmium and copper may also be used.

In the case of zinc, the active mass is obtained by intimately dry mixing finely subdivided powdered zinc and silver. The required amount of mercury is added to the homogenized pulverulent mixture and is distributed throughout the mass by further mixing and homogenizing steps known to those skilled in the art, until a fine composite powdered amalgam is obtained. The amalgamating process is then continued by wet treatment, i.e., prolonged boiling with diluted sulfuric acid. In this manner, the mercury is evenly distributed throughout the mixture. The wet treatment is completed when the amount of free acid in the dilute acid solution remains practically constant or varies only very slightly.

The thus produced powdered active mass is washed until neutral and then is filtered off and dried in a hot air stream. The active mass in the form of a dry and screened powder constitutes a highly plastic material which is very suitable to be pressed onto the silver-plated electrode support at a pressure which is to be sufficiently small so as to maintain the desired porosity, however, without detracting from the mechanical firmness of the pressed mass on the electrode support.

The thus produced negative electrodes including the pressed active mass thereon are then again wet-treated for some time in an aqueous sulfuric acid solution of medium concentration and at a temperature of 40° C. The purpose of this treatment is to further homogenize the silver-containing composite amalgam and to obtain the desired intimate contact between the active mass and the supporting portion of the electrode. A similar treatment is carried out in cases where zinc is replaced by cadmium or other suitable metals.

It will be understood, however, that the above described method of producing the active mass and the negative electrode is given by way of example only and that the present invention is not limited to any specific manner of producing the active mass and the negative electrodes of the battery according to the present invention.

The zinc-silver amalgam which may be used according to the present invention, preferably will contain between 45% and 55% by weight, and most preferably 51%, of zinc; between 4 and 12%, and most preferably about 8%, of silver; and between 30 and 50%, most preferably 41% of mercury.

The cadmium-silver amalgam preferably will contain between 45% and 57%, and most preferably about 53%, of cadmium; between 3.5 and 7%, and most preferably about 7%, of silver; and between 30 and 48%, and most preferably about 40%, of mercury.

It is also possible to utilize, according to the present invention, a composite amalgam which contains zinc, cadmium, silver and mercury, in other words, to replace a portion of the zinc of the above described zinc-silver mercury amalgam with cadmium, preferably within percent by weight limitations described further above.

For instance, an amalgam consisting of 45% zinc, 44% mercury and 11% silver may be pressed at a pressure of about 185 kg./cm.$^2$ onto drilled silver-plated iron plates or sheets. The amount of silver plated onto the iron sheets or the like in the area of the terminals of the negative plates, preferably in a cyanide bath, should be between about 50 mg./cm.$^2$ and 60 mg./cm.$^2$.

The negative plates are formed with terminals or bridges of lead, silver, silver-plated copper or the like which may be riveted to the plates, and the thus produced plates are capable to replace the negative plates of an equivalent lead battery.

It is important to note that the silver plating of the supporting portion of the negative electrodes, such as sheets, grids or other conventional support structures which do not consist of silver, must be carried out after their machining has been completed in order to assure a complete silver coating of the entire surface of such supporting portions. After plating such support portions are subjected to a suitable thermic treatment in an inert or reducing atmosphere. This, per se, is well known to those skilled in the art.

Electrodes of this type will be capable of producing discharges of between about 31 and up to 44 amp./dm.$^2$ in a 36% sulfuric acid electrolyte for a period longer than that for which such discharge can be produced with their equivalent spongy lead electrodes.

The thermic or heat treatment of the silver-plated support serves to eliminate pores in the silver film protecting the electrode frame, it may be carried out, for instance in a reducing atmosphere at about 450° C.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing, in which:

Figure 1:
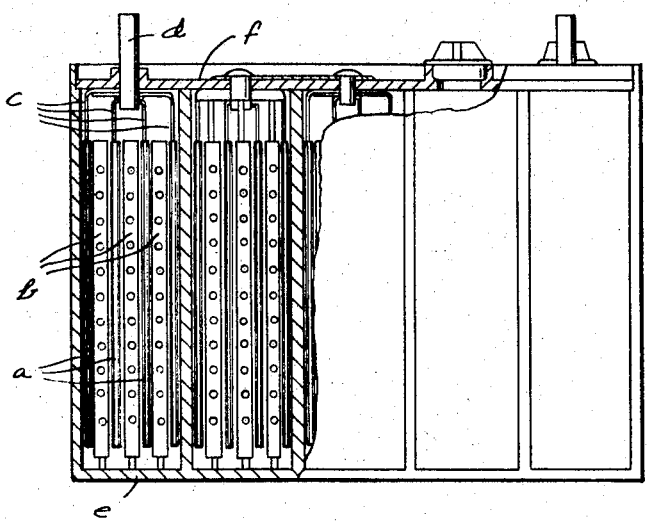
FIG. 1 is an elevational view, partially in cross section, of a storage battery in accordance with the present invention.
Figure 2:
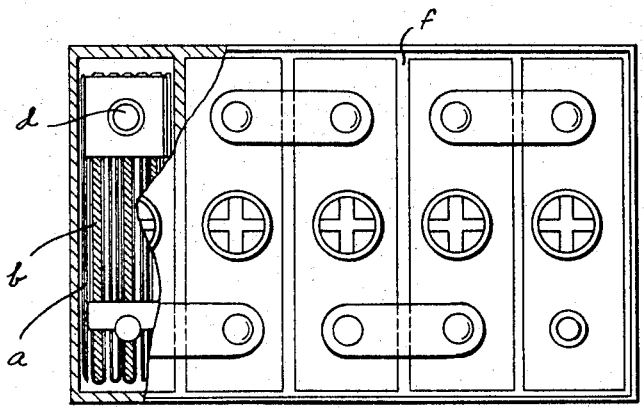
FIG. 2 is a plan view taken from above and partially in cross section of the storage battery illustrated in FIG. 1.

Referring now to the drawing, and particularly to FIGS. 1 and 2, it will be seen that each cell of the battery includes four negative plates $a$ and three positive plates $b$. The positive plates are individually enveloped in a separating band or spacing member made of microporous polyvinyl chloride, which band may be formed with or without lateral holes, and which is illustrated in more detail in FIGS. 7 and 8. The negative plates are made of a porous composite amalgam consisting of zinc-silver-mercury which has been pressed onto a previously silver-plated, drilled iron plate. The silver-plated terminals $c$ of these plates are joined and riveted at $d$ to a cylindrical terminal made of antimoniated lead, which serves as the terminal or negative electric collector for the negative electrodes of the respective cell.

During operation of the battery, mercury moves along these terminals $c$ and reaches the lead terminal so that a perfect electric contact is obtained. The positive plates rest on the container bottom $e$ while the negative plates are riveted to the cover $f$ and extend downwardly therefrom. The negative plates are spaced from the container bottom so as not to come in contact with sediment formed at the positive plates during operation of the battery. The positive plates may be of any of the conventionally used types of positive plates for lead accumulators such as Faure type or Plante type and, of course, the number of positive as well as of negative plates may be varied depending on the desired battery capacity and potential.

Figure 3:
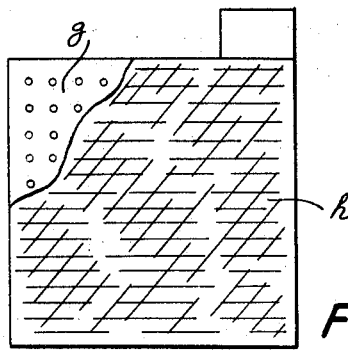
FIG. 3 is an elevational view of a negative electrode plate according to the present invention.

FIG. 3 illustrates a negative plate consisting of a silver-plated iron plate $g$ on which is pressed a layer $h$ of zinc-silver-mercury or cadmium-silver-mercury composite amalgam.

Figure 4:
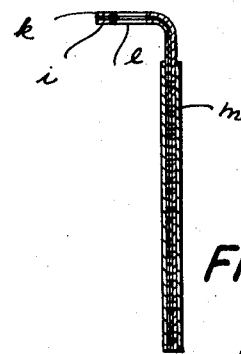
FIG. 4 is a magnified cross sectional view of the electrode of FIG. 3.

In the magnified section of the electrode structure shown in FIG. 4 it will be seen that the electrode comprises an iron plate $i$, an intermediate coating of copper, tin or the like $k$, a silver film or coating $l$ and the active mass $m$ consisting of the composite amalgam pressed onto the support structure formed of elements $i$, $k$ and $l$.

Figure 5:
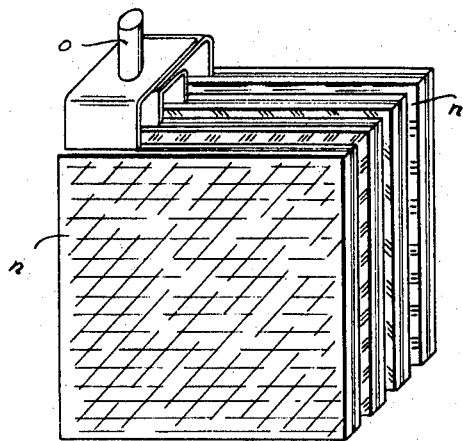
FIG. 5 is a perspective view of an assembly of negative electrode plates.
Figure 6:
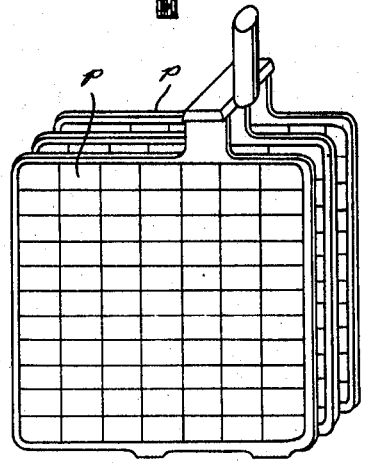
FIG. 6 is a perspective view of a conventional set of lead dioxide positive plates.

FIG. 5 illustrates an assembly of negative electrode plates $n$ which are riveted to antimoniated lead terminal $o$, while FIG. 6 illustrates a conventional set of lead dioxide positive plates $p$.

Figure 7:
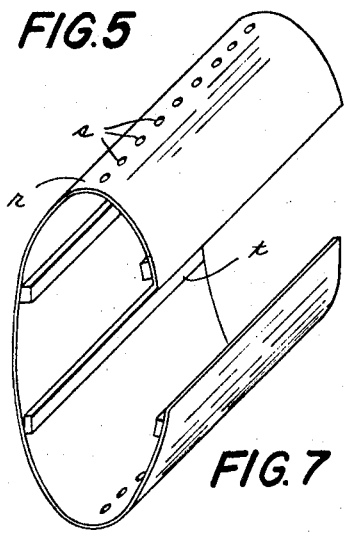
FIG. 7 is a perspective view of a separator or spacing member prior to assembly of the same.
Figure 8:
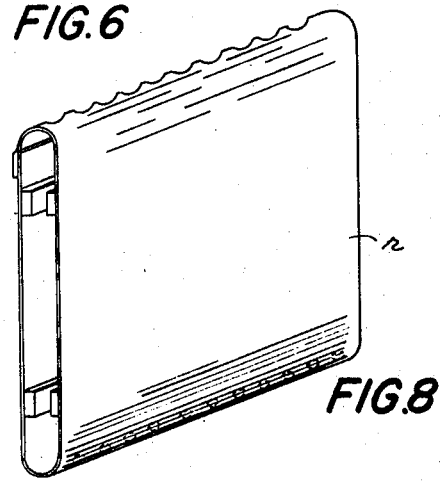
FIG. 8 is a perspective view of a closed separating member ready to envelope a positive plate of the battery.

Referring now to FIGS. 7 and 8, a separating band or spacer or separating member $r$ is shown which may consist of a sheet of microporous polyvinyl chloride and formed with lateral holes $s$ which serve for a better diffusion of the acidic electrolyte into close proximity with the lead dioxide plates. The separating member $r$ also includes plastic spacer elements $t$ which serve to maintain a suitable distance of the major surface portions of the positive plates from the separator and are intended to prevent during charging of the battery the dentritic growth of zinc and the formation of undesirable electrically conductive bridges. While FIG. 7 illustrates the spacer or separating member $r$ in open condition, FIG. 8 illustrates the same in completely assembled state ready to receive a positive electrode plate.

The table below will serve for comparing the results obtained with two 12-volt batteries of 38 amp./hr. nominal capacity, such as conventional automobile batteries, of which one is a conventional lead battery, and the other a lead dioxide/zinc-silver-mercury battery in accordance with the present invention.

The conventional lead battery described in the table has six cells whose size, respectively, is 3.5 x 14 x 16.5 cm. Each cell comprises three positive plates and four negative plates. The size of the plates is 12 x 12 cm., with an energy output of 12.6 amp./hr. for each positive plate and 9.5 amp./hr. for each negative plate. The electrolyte is a 36% aqueous sulfuric acid solution having a specific gravity of 1.268. The nominal capacity of the battery is 38 amp./hr. During a five hour discharge, the battery may provide 27 amp./hr.

The equivalent zinc-silver amalgam/lead dioxide battery according to the present invention and described in the table has five cells each having a size of 3.5 x 14 x 16 cm. Each cell includes three positive plates and four negative plates and the plate size is 11.3 x 11.3 cm., with an output of 12.6 amp./hr. for each positive plate. The active mass of the negative plates, respectively, consists of 40 grams of a composite zinc-silver amalgam having a composition of 46.4% zinc, 12.6% silver and 41.0% mercury. The theoretical capacity for each negative plate is 15.4 amp./hr. The negative active mass is attached by pressing to a perfectly silver-plated and drilled iron sheet. Drill holes (which also must be perfectly silver-plated) in the iron sheet increase the electrolyte diffusion. The positive and negative plates are separated by means of reinforced, microporous polyvinyl chloride bands or bags such as are illustrated in the drawing. The material of these separators has a 55% porosity with port diameters of between about 3 and 10 microns, and the thickness of the material of the separator is about 1.0 mm. The polyvinyl chloride material has been previously vacuum impregnated with the electrolyte and the latter is a 36% aqueous sulfuric acid solution having a specific gravity of 1.268.

The set of negative plates for each cell is obtained by fastening the plates by means of an antimoniated lead terminal which is squeeze-riveted onto the plates with a cross rivet of antimoniated lead. It will be noticed that there is an excess of zinc in the active mass of the negative plates, however, this is preferred feature for obtaining optimum working conditions of the battery.

This battery of the present invention has a nominal capacity, i.e., a capacity of its positive plates, of 38 amp./hr. During a five hour discharge, the battery provides 26.5 amp./hr.

Each cell contains 350 cm.³ of 36% sulfuric acid.

TABLE I

| Size: | Conventional lead battery, 12 volts | 12 volt battery in accordance with the present invention |
|---|---|---|
| Length (mm.) | 254 | 195 |
| Width (mm.) | 141 | 141 |
| Height (mm.) | 175 | 156 |
| Number of cells | 6 | 5 |
| Single cell practical voltage (volts) | 2 | 2.5 |
| Weight (with electrolyte) (kg.) | 14.5 | 9.7 |
| Volume (external) (dm.³) | 5.78 | 4.35 |
| Nominal capacity (amp./hr.) | 38 | 38 |
| Energy per unit of weight (W, hr./kg.) | 31 | 47 |
| Energy per unit of volume (W, hr./dm.³) | 78 | 104 |

It will be understood that each of the elements described above, or two or more together, may also find a useful application in other types of batteries differing from the types described above.

While the invention has been illustrated and described as embodied in an acidic storage battery with a lead dioxide-containing positive electrode, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A storage battery, comprising, in combination, a housing; at least one positive electrode including lead dioxide as active mass, located in said housing; at least one negative electrode including as negative active mass a composite amalgam of silver and of at least one metal selected from the group consisting of zinc, cadmium and copper, located in said housing spaced from said positive electrode; and an acidic electrolyte consisting essentially of sulfuric acid of effective concentration located in said housing and contacting said positive and negative electrodes.

2. A storage battery, comprising, in combination, a housing; at least one positive electrode including lead dioxide as active mass, located in said housing; at least one negative electrode including as negative active mass a composite amalgam of silver and of at least one metal selected from the group consisting of zinc, cadmium and copper, located in said housing spaced from said positive electrode; and an acidic electrolyte consisting essentially of a between about 25 and 36% aqueous solution of sulfuric acid located in said housing and contacting said positive and negative electrodes.

3. A storage battery as defined in claim 2, wherein said composite amalgam consists of mercury, zinc and silver.

4. A storage battery as defined in claim 2, wherein said composite amalgam consists of mercury, cadmium and silver.

5. A storage battery as defined in claim 2, wherein said composite amalgam consists of mercury, copper and silver.

6. A storage battery as defined in claim 2, wherein said composite amalgam consists of mercury, zinc, cadmium and silver.

7. A storage battery as defined in claim 2, wherein at least a portion of said silver and at least a portion of said one metal are present in the form of an alloy.

8. A storage battery as defined in claim 2, wherein said negative electrode includes a support, and said negative active mass is a porous mass adhering to said support.

9. A storage battery as defined in claim 8, wherein said support is formed essentially of a material selected from the group consisting of electrically conductive metals and alloys capable to resist chemical attack by said acidic electrolyte.

10. A storage battery as defined in claim 8, wherein said support consists of metal other than silver and of a silver coating covering said metal.

11. A storage battery as defined in claim 8, wherein silver forms an essential constituent of said support.

12. A storage battery comprising, in combination, a housing; at least one positive electrode including lead dioxide as active mass, located in said housing; at least one negative electrode including as negative active mass a composite amalgam of silver and of at least one metal selected from the group consisting of zinc, cadmium and copper, located in said housing spaced from said positive electrode; and an acidic electrolyte consisting essentially of an aqueous solution of sulfuric acid located in said housing and contacting said positive and negative electrodes.

References Cited

UNITED STATES PATENTS

| 1,020,568 | 3/1912 | Morrison | 136—23 |
| 3,170,820 | 2/1965 | Drengle et al. | 136—120 |
| 3,265,534 | 8/1966 | Ruetschi | 136—26 |

WINSTON A. DOUGLAS, *Primary Examiner.*

C. F. LeFEVOUR, *Assistant Examiner.*

U.S. Cl. X.R.

136—24, 120